(12) United States Patent
Bernacki et al.

(10) Patent No.: US 7,801,874 B2
(45) Date of Patent: Sep. 21, 2010

(54) REPORTING TOOLS

(75) Inventors: Maryam Bernacki, Novi, MI (US); Louis Bolt, Westland, MI (US); Jeremy Moerdyke, Farmington Hills, MI (US)

(73) Assignee: MAHLE Powertrain LLC, Novi, MI (US)

( * ) Notice: Subject to any disclaimer, the term of this patent is extended or adjusted under 35 U.S.C. 154(b) by 124 days.

(21) Appl. No.: 11/256,806

(22) Filed: Oct. 24, 2005

(65) Prior Publication Data

US 2006/0143162 A1 Jun. 29, 2006

Related U.S. Application Data

(60) Provisional application No. 60/621,322, filed on Oct. 22, 2004.

(51) Int. Cl.
 *G06F 17/30* (2006.01)
(52) U.S. Cl. .................. 707/706; 707/713; 707/732; 707/754
(58) Field of Classification Search .............. 707/3–4, 707/200, 104.1, 706, 713, 732, 754
See application file for complete search history.

(56) References Cited

U.S. PATENT DOCUMENTS

| | | | |
|---|---|---|---|
| 6,253,195 B1 * | 6/2001 | Hudis et al. ................ 707/2 |
| 6,356,892 B1 * | 3/2002 | Corn et al. .................. 707/3 |
| 6,750,864 B1 * | 6/2004 | Anwar ...................... 345/440 |
| 6,789,091 B2 * | 9/2004 | Gogolak ................. 707/104.1 |
| 7,334,185 B2 * | 2/2008 | Wicks ...................... 715/209 |
| 2003/0065650 A1 * | 4/2003 | Annand et al. ............... 707/3 |
| 2004/0128120 A1 * | 7/2004 | Coburn et al. .............. 703/26 |
| 2005/0022115 A1 * | 1/2005 | Baumgartner et al. ..... 715/513 |
| 2005/0055381 A1 * | 3/2005 | Ganesh et al. ............ 707/200 |
| 2005/0138160 A1 * | 6/2005 | Klein et al. ............... 709/223 |
| 2006/0059024 A1 * | 3/2006 | Bailey et al. ................. 705/5 |
| 2006/0200455 A1 * | 9/2006 | Wilson ....................... 707/4 |
| 2007/0156668 A1 * | 7/2007 | Dettinger et al. ............ 707/4 |

* cited by examiner

*Primary Examiner*—Don Wong
*Assistant Examiner*—Hanh B Thai
(74) *Attorney, Agent, or Firm*—Gifford, Krass, Sprinkle, Anderson & Citkowski, P.C.

(57) ABSTRACT

Reporting tools possess improved filtering, display and alerting methodologies offering enhanced versatility. According to one aspect of the invention, the method has an independent data filtering mechanism, an independent output function that populates an n-dimensional array, and an independent display function. According to a different embodiment, a set of parameterized query relationships organizes a series of data filters into a graphical representation of a parent/child hierarchy in order to execute a series of hierarchical queries where each simple query builds a final query that is complex. According to yet a further alternative embodiment, Boolean logic is used in a series of n-number hierarchical filters, and a combination of n-number outputs, to generate notification in the form of emails/messages/etc. based on data that is dynamically entered into the system.

16 Claims, 3 Drawing Sheets

REPORTING TOOLS

REFERENCE TO RELATED APPLICATION

This application claims priority from U.S. Provisional Patent Application Ser. No. 60/621,322, filed Oct. 22, 2004, the entire content of which is incorporated herein by reference.

FIELD OF THE INVENTION

This invention relates generally to software reporting tools and, in particular, to reporting tools having improved filtering, display and alerting methodologies offering enhanced versatility.

BACKGROUND OF THE INVENTION

Broadly, reporting tools retrieve information about something from a database, and create "reports" allowing a user to organize data so that it can be more easily understood by a layperson. For example, raw or unformatted data may be presented as a graph or a chart.

Currently, most reporting tools use various filtering methods to query a database, run outputs on the resulting data set, and display the information. One approach asks the user to manually enter a range of data to query in the database. This typically requires the user to have understanding of Boolean, SQL, and databases. An alternate approach limits the user to pre-existing choices for the setup of filter-relationships, outputs, and display types through a "wizard" type setup process. Though seemingly more automated, this may limit power or flexibility.

SUMMARY OF THE INVENTION

This invention relates to reporting tools having improved filtering, display and alerting methodologies offering enhanced versatility. According to one aspect of the invention, the method has an independent data filtering mechanism, an independent output function that populates an n-dimensional array, and an independent display function.

According to a different embodiment, a set of parameterized query relationships organizes a series of data filters into a graphical representation of a parent/child hierarchy in order to execute a series of hierarchical queries where each simple query builds a final query that is complex.

According to yet a further alternative embodiment, Boolean logic is used in a series of n-number hierarchical filters, and a combination of n-number outputs, to generate notification in the form of emails/messages/etc. based on data that is dynamically entered into the system.

DETAILED DESCRIPTION OF THE INVENTION

This invention is directed to software reporting tools having improved filtering methodologies offering enhanced versatility. At least three patentably distinct aspects of the invention are described in this specification. These aspects, which may be used independently or in any combination, are as follows:

1. A method having an independent data filtering mechanism, an independent output function that populates an n-dimensional array, and an independent display function;
2. A method of parameterized query relationships that organizes a series of data filters into a graphical representation of a parent/child hierarchy in order to execute a series of hierarchical queries where each simple query builds a final query that is complex; and
3. A method that uses Boolean logic in a series of n-number hierarchical filters and a combination of n-number outputs in order to generate notification in the form of emails/messages/etc. based on data that is dynamically entered into the system.

The following headings correspond to these individual components.

INDEPENDENT FILTERS, OUTPUTS, AND DISPLAY

In existing reporting tool packages, the concept of filters, outputs, and display are the same. Current packages typically execute a parameterized query on the database to get the useful information. The output and display of the query are generally hard-coded into the program in order to display the data according to what is useful at the time the program was coded.

Figure 1:
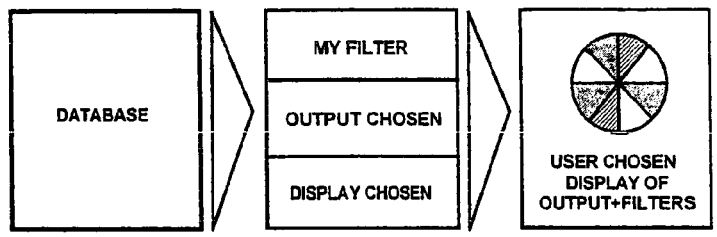
FIG. 1 is a flow diagram that shows an output as an n-dimensional range result with a given domain input, the output report being a combination of a filter and an output used to generate a desired display, such as the pie chart.

In contrast, according to this aspect of the invention, a filter limits the domain population to a subset of the entire data set. An output is an n-dimensional range result with a given domain input, and the output report is a combination of a filter and an output used to generate a desired display, such as the pie chart of FIG. 1. Other outputs are certainly possible, including two-and three-dimensional bar charts, graphs, and so forth.

Within this application, a filter controls the scope and scale of data returned through a database query. The filters are user-definable and user-configurable. Users create filters into a hierarchical structure to optimize and refine data query returns. This structure creates filters through user-defined parent-child relationships. These relationships enable data queries to pass through one or many filters, producing outputs refined by the user's selections. Each child filter limits the domain based on the parent filter's output. The Filter tree can grow and expand as required, resulting in a dynamic and flexible reporting system.

By definition, an output is an n-dimensional range result with a given domain input. Within this application, an output analyzes and quantifies the results returned from a filtered data query. A significant feature of this application is the fact that the output generated from the filtered data is completely separate from the filters themselves. When a report is created, users select the filter through which the data query will pass. Users must also select the Output Type, which specifies how the data returned from the query will be analyzed and reported.

According to this embodiment of the invention, a user first defines the subset of data that the report should be created based on (1 to n filters). Second, they define how that subset of data should be analyzed/calculated, and third, they define the type of display that should be used to display the calculation/analyzed result set (output). The output is saved in an n-dimensional array, which will be used by the display object.

This methodology has been implemented by architecting the database tables to store and update the data created by filters in a subset of tables. The software based off of these set of filter tables performs the selected calculations to create the output. The output result set is stored in a set of output tables and is sent to the display object to the display the final report. Each filter is derived from its parent filter and has a its own subset of data stored in the database, which enables the user to associate any output type to that filter.

The process according to this aspect of the invention is unique in making the outputs generated from the filter data completely separate from the filters as well as the display function. For each parameterized filter that is executed, the user can choose an output AND a display. The user can make changes to the filter, the output, and/or the display at any time during program execution. Stated differently, a user can join any output with any filter into any display they choose.

There are many advantages to this approach. Having completely independent filter, output and display functions allow for greater data-mining flexibility. The design allows the user to mix and match filters, outputs, and displays without having to create a new build of the software.

Figure 2:
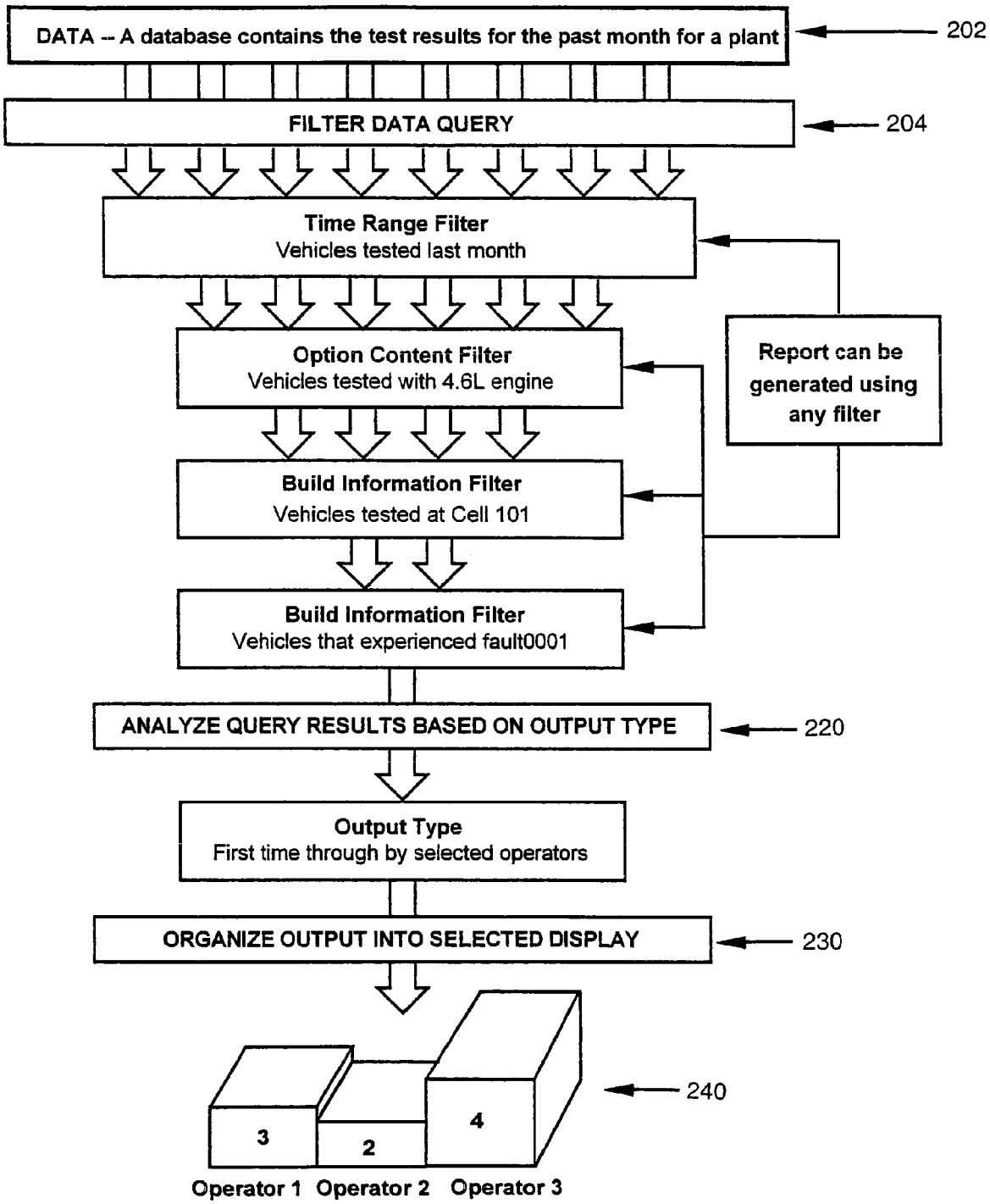
FIG. 2 is a diagram that depicts a specific example according to this aspect of the application.

FIG. 2 is a diagram that depicts a specific example according to this aspect of the application. Database 202 contains the test results for vehicles tested over the past month at a particular assembly plant. User-configurable filter query 204 in this case applies 4 filters of the data as follows:

Tested last month (time range filter applied)
Having all wheel drive (option content filter applied)
Performed testing at Station 1 (test station information filter applied)
Testing resulted in failure (test station information filter applied)

At 220, the results are analyzed as a function of output type which, in this case, is defined as "First Time Through by Operator." At 230 the output is organized into a display type, also selected by the user, resulting in a vertical bar graph for Operator 1, Operator 2, and Operator 3. The numbers in the bars indicate particular individuals. Note that at any time, the user may change any item in this example and have the report dated to their liking (i.e. changing the display to a pie chart).

BOOLEAN FILTER CREATOR (HIERARCHICAL GRAPHICAL QUERYING)

Figure 3:
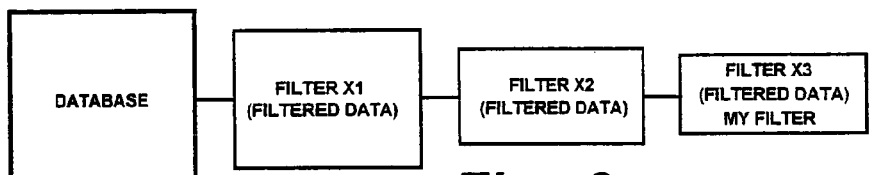
FIG. 3 is a illustrates one example of the how filters relate with each other according to an embodiment of the invention.

In many existing reporting tools, the querying of the database is executed as one large parameterized query. Usually the user will have to step through a wizard and pick certain options to get the query they desire. In contrast, this aspect of the invention uses parent-child relationships to organize the filters into a hierarchical series of simple queries (Hierarchical Graphical Querying). Each new child filter limits the domain based on the parent filter's output. This design is very ergonomic to a user having little knowledge of how to write SQL query statements. The data relationships are inherent to the design. FIG. 3 illustrates one example of the how the filters relate with each other.

In terms of advantages, this design allows for better management of data with less hardware (i.e. Web servers). The queries are smaller, and therefore the load on the server that houses the data set is lowered.

This embodiment uses a hierarchical filter structure to enable and optimize data query flexibility. This structure could be comprised of a combination of administrative and user-defined filters, which combine to form parent-child relationships. Such relationships enable data queries to pass through one or many filters, producing outputs refined by the user's specifications. Each child filter limits the domain based on the parent filter's output. This structure can grow and expand as required, resulting in a dynamic and flexible reporting system.

This concept is presented to users via a graphical interface. As such, users can create a desired structure by selecting one to n filters in a parent-child relationship to establish the preferred subset of data. This graphical interface enables users to dynamically build complex database query statements without knowing SQL or without having to modify the software.

This methodology is implemented by architecting the database to store data for each specified filter; this filtered data is queried off the data belonging to its parent filter. The software queries the database and displays the saved filter data in a graphical format. Using this graphical interface, users add/modify desired filter(s). Based on the chosen filter criteria and the data belonging to the parent filter, the software creates a new subset of data for the new filter to be stored in the database. Since each filter has its own subset of data and a specified parent, users can add new filters to any existing filters or remove any unwanted filters.

BOOLEAN OUTPUTS THAT GENERATE ALERTS

A further aspect of the invention utilizes a unique alerting system that the user can set up to send alert message via a chosen means of communication such as an e-mail, buzzer, pager, light, etc. The type of alert may result from the analysis of a set of "n" outputs and filters using macros and Boolean logic to produce a desired indication when true.

A typical approach would have the alert be a separate data query that executes on an output or filter with a particular frequency. The user would generally input this query by answering hard-coded questions provided by the software (i.e., a wizard). The method used in this application further utilizes the outputs that are already created to inform the alerting system. Therefore, users are able to select one or a combination of existing outputs to generate an alert. When creating a new alert, users select the desired output(s) and select a Boolean equation to be executed on the output(s). If the result set of the Boolean equation is true, an alert will be sent. When a filter and an output are combined, an n-dimensional array result set is created. This array will be analyzed using a Boolean String, which will generate a true/false result. The Boolean logic can be executed against one or many n dimensional arrays. This result of the Boolean expression will determine if the alert should be issued.

Figure 4:
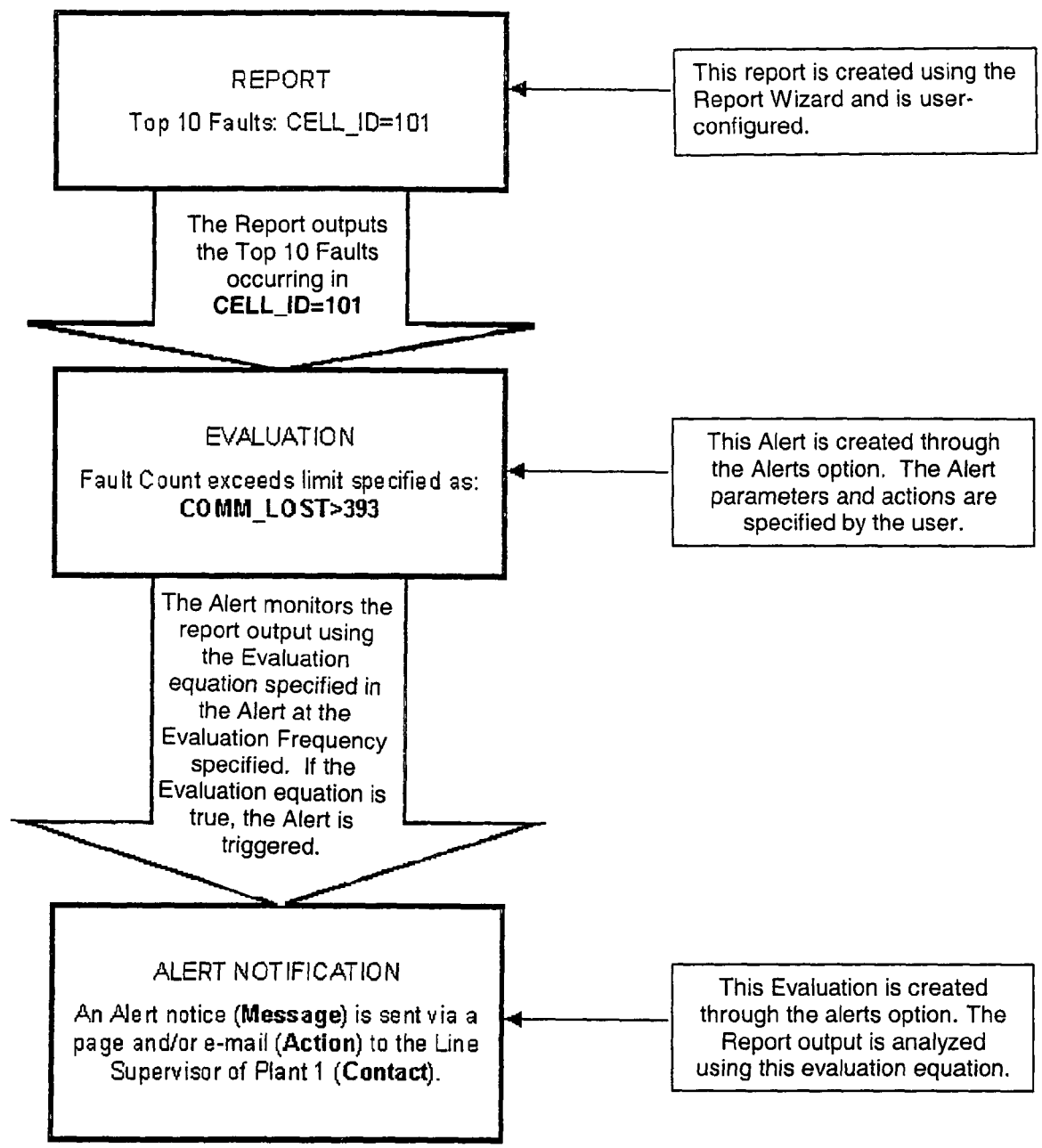
FIG. 4 is an example of an alert based off of one output.

To implement the methodology the following items will be stored in the database to save the user specified alerts: the Boolean equation, frequency interval, and the selected outputs. Since the output data is already stored in the database, the equation will be evaluated at the interval inputted by the user, once the equation becomes true the alert is sent. An example of an alert based off of one output is represented in FIG. 4.

One advantage to this aspect of the invention is that a user has a very flexible approach to setting up alerts. The advantages to using the outputs/reports to generate the alerts is that it enables the user to execute very complex SQL statements on the database without having to know SQL commands or anything about databases.

Figure 5:
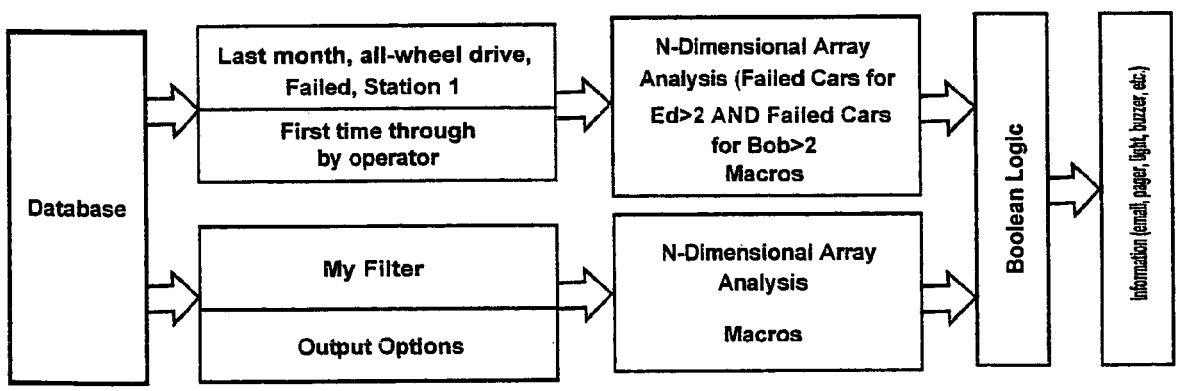
FIG. 5 shows a process involved in creating an alert associated with an output of "First Time Through by Operator" for the filtered data for all wheel drive vehicles that failed at Station 1 in the past month.

The example illustrated in FIG. 5 shows a process involved in creating an alert associated with an output of "First Time Through by Operator" for the filtered data for all wheel drive vehicles that failed at Station 1 in the past month. The user creates an analysis statement for the output that directs an alert to be sent whenever two operators (i.e., Ed AND Bob) fail more than 2 cars.

We claim:

1. A software tool for reporting aspects of a database, comprising:
   a plurality of user-defined data filters, one or more user-defined output functions, and one or more user-defined display functions;
   each user-defined data filter being operative to apply a pre-defined query specific to the data stored in a computer database to identify a subset of data in the database independent of the user-defined output and display functions, with subsequent data filters being applied in a hierarchical, parent-child relationship to further refine the subset of data in the database and output a query result;
   each user-defined output function being operative to analyze the query result and generate an output type; and
   each user-defined display function being operative to display the output type as a different graphical representation on a display device.

2. The software tool of claim 1, wherein for each filter that is executed, the user can choose an independent output, display, or both.

3. The software tool of claim 1, further including an alerting system that responds to an output or filter.

4. The software tool of claim 3, wherein the alert is in the form of a message via a chosen means of communication.

5. The software tool of claim 3, wherein the alert results from the analysis of a set of "n" outputs and filters using macros and Boolean logic.

6. The software tool of claim 3, wherein the alert is a separate data query that executes on an output or filter with a particular frequency.

7. The software tool of claim 6, wherein a user inputs the query by responding to system-generated questions.

8. The software tool of claim 1, wherein previously generated outputs are used as inputs to an alerting system.

9. A reporting method adapted for use with a computer database, comprising the step of:
   user-defining a plurality of data fillers, one or more output functions and one or more display functions;
   each data filter representing a predetermined query corresponding to different subsets of the data stored in the database;
   applying the filters in a hierarchical, parent-child sequence to generate a query result independent of output type and display function;
   applying at least one of the output functions to analyze the query result and generate an output type; and
   applying at least one of the display functions to display the output type as a desired graphical representation.

10. The reporting method of claim 9, wherein, for each filter that is applied, the user can choose an independent output, display, or both.

11. The reporting method of claim 9, further including the step of providing an alert system that responds to an output or filter.

12. The reporting method of claim 11, wherein the alert is in the form of a message via a chosen means of communication.

13. The reporting method of claim 11, wherein the alert results from the analysis of a set of "n" outputs and filters using macros and Boolean logic.

14. The reporting method of claim 11, wherein the alert is a separate data query that executes on an output or filter with a particular frequency.

15. The reporting method of claim 9, wherein a user inputs the query by responding to system-generated questions.

16. The reporting method of claim 9, wherein previously generated outputs are used as inputs to an alerting system.

* * * * *

UNITED STATES PATENT AND TRADEMARK OFFICE
CERTIFICATE OF CORRECTION

PATENT NO. : 7,801,874 B2 Page 1 of 1
APPLICATION NO. : 11/256806
DATED : September 21, 2010
INVENTOR(S) : Maryam Bernacki et al.

It is certified that error appears in the above-identified patent and that said Letters Patent is hereby corrected as shown below:

Column 6, line 7: After "data" replace "fillers" with --filters--.

Signed and Sealed this

Thirtieth Day of November, 2010

David J. Kappos
*Director of the United States Patent and Trademark Office*